(12) United States Patent
Kuroki et al.

(10) Patent No.: US 6,784,951 B2
(45) Date of Patent: Aug. 31, 2004

(54) DISPLAY DEVICE, MANUFACTURING METHOD THEREOF AND IMAGE TERMINAL UNIT EMPLOYING THE SAME

(75) Inventors: Takuya Kuroki, Kikuchi-gun (JP); Yoshihide Nishida, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 346 days.

(21) Appl. No.: 09/921,567

(22) Filed: Aug. 6, 2001

(65) Prior Publication Data
US 2002/0051102 A1 May 2, 2002

(30) Foreign Application Priority Data
Nov. 1, 2000 (JP) ........................................ 2000-334708

(51) Int. Cl.[7] ........................................... G02F 1/1333
(52) U.S. Cl. ........................... 349/58; 349/94; 349/128; 349/129
(58) Field of Search ............................ 349/58, 94, 128, 349/129, 156

(56) References Cited

U.S. PATENT DOCUMENTS

| | | | |
|---|---|---|---|
| 5,375,005 A | * 12/1994 | Komano | 359/48 |
| 6,426,784 B1 | * 7/2002 | Sakai et al. | 349/58 |
| 2002/0191126 A1 | * 12/2002 | Sasuga et al. | 349/58 |

* cited by examiner

*Primary Examiner*—Jerome Jackson
*Assistant Examiner*—Joseph Nguyen
(74) *Attorney, Agent, or Firm*—Oblon, Spivak, McClelland, Maier & Neustadt, P.C.

(57) ABSTRACT

A display device comprising a front frame having an annular picture frame and having a pair of side faces and a pair of end faces provided in outer circumferential sides of the picture frame, a mold frame sandwiched by the pair of side faces and the pair of end faces, and a display panel arranged between the front frame and the mold frame. Stopper pieces for alignment of the display panel are formed in the side faces and the end faces. A display device in which the picture frame of the front frame can be narrowed is obtainable.

21 Claims, 11 Drawing Sheets

DISPLAY DEVICE, MANUFACTURING METHOD THEREOF AND IMAGE TERMINAL UNIT EMPLOYING THE SAME

BACKGROUND OF THE INVENTION

The present invention relates to a display device in which a stopper piece for aligning a display panel is formed in a frame, a manufacturing method thereof, and an image terminal unit in which the display device is employed.

FIG. 11 is an exploded perspective view of main constituent members of a conventional liquid crystal display device.

A liquid crystal display panel 100 is connected with a circuit substrate 102 via base material films of a plurality of TCPs 101 (Tape Carrier Package) arranged in spaced apart manner at predetermined intervals. This liquid crystal display panel 100 is sandwiched between a front frame 103 and a mold frame 104 to manufacture a liquid crystal display device 105.

In the liquid crystal display device 105 having the structure described above, a positional drift in the thickness direction of the liquid crystal display panel 100 is prevented by sandwiching the liquid crystal display panel 100 between the mold frame 104 and the front frame 103. Alignment in the vertical and horizontal directions of the liquid crystal display panel 100 is implemented by stopper pieces 106 called ribs shown in FIG. 11.

However, in the liquid crystal display device, there is a problem that narrowing the annular picture frame of the front frame 103 is difficult. Particularly, recently, there has been intensified a demand of users (personal computer makers) that the picture frame of the liquid crystal display device is narrowed as much as possible and then this is mounted in a personal computer so that a useless space in an image face is eliminated so as to achieve discrimination in goods, and thus the significance of this problem has become tangible.

The problem is explained more specifically below referring to drawings. FIG. 12 is a sectional view of a part taken along the line A—A shown in FIG. 11 in a state where the constituent members of FIG. 11 are assembled.

The ribs 106 are integrally molded with the mold frame 104 made of polycarbonate, and it is essential to ensure a predetermined wall thickness (about 1 to 2 mm) for molding and mechanical strength of the ribs. Here, by means of the ribs 106, the alignment of the liquid crystal display panel 100 is implemented and contact interference of the TCP films 101 and the front frame 103 is avoided as shown in FIG. 12.

Since such structure is adopted, the width L of the annular picture frame of the front frame 103 extends only a distance corresponding to the wall thickness of the stopper piece (1 to 2 mm), and this is one of factors of obstruction to narrowing of the picture frame.

The present invention was made to solve the above problem, and it is a first object of the present invention to provide a display device by which the picture frame of a front frame can be narrowed.

A second object is to provide a display device in which the picture frame of a front frame can be narrowed and the precision of alignment of a display panel and a mold frame can be improved.

A third object is to provide a manufacturing method of a display device in which process of alignment work for a display panel and a mold frame can be simplified and which can cope with narrowing of the picture frame.

A fourth object is to provide an image terminal unit in which a display image face can be widened by narrowing the picture frame of a front frame.

Japanese Unexamined Patent Publication No. 61795/1997 discloses that a liquid crystal panel is fastened by a protrusion provided in a front frame. Alignment of a liquid crystal panel is implemented by the protrusion, and this point is common to a function of a stopper piece in the present invention. However, according to FIG. 1 of the Japanese Unexamined Patent Publication No. 61795/1997, a circuit substrate 2 (corresponding to a mold frame of the present invention) is not held by side end faces of a metal frame 4 (corresponding to a front frame of the present invention). Therefore, the problem of attempting to narrow the picture frame of a liquid crystal display device cannot be recognized from the content described in that publication, and means to solve a problem described in the publication is different from that of the present invention described below.

SUMMARY OF THE INVENTION

In accordance with a first aspect of the present invention, there is provided a display device comprising a front frame having an annular picture frame and having a pair of side faces and a pair of end faces provided in outer circumferential sides of the picture frame, a mold frame sandwiched by the pair of side faces and the pair of end faces, and a display panel arranged between the front frame and the mold frame, wherein stopper pieces for alignment of the display panel are formed in the side faces and the end faces.

The stopper pieces are preferably stepped portions formed by working the side faces and the end faces, ones formed by folding protrusions protruding from a root of the side faces and the end faces, or spacer members stuck on the side faces and the end faces.

The display panel might be connected to a circuit substrate via a plurality of films arranged and spaced by gaps, and the stopper pieces might be inserted into the gaps. Preferably, the gaps into which the stopper pieces are inserted are made wider than other gaps.

By the stopper pieces, not only alignment of the display panel but also the alignment of the mold frame can be implemented.

Distances between the side face and the end face and an alignment face of the stopper piece are set to 0.1 to 0.5 mm. The distances are preferably 0.3 to 0.5 mm.

As the display panel, a liquid crystal display panel, a plasma display panel, a field emission type display panel, a light emitting diode display panel, or an electroluminescent display panel is applied.

In accordance with a second aspect of the present invention, there is provided a display device comprising a front frame having an annular picture frame and having a pair of side faces and a pair of end faces provided in outer circumferential sides of the picture frame, and a display panel arranged between the front frame and a mold frame, wherein first stopper pieces for alignment of the display panel are formed in the side face and the end face, second stopper pieces for alignment of the display panel are formed in a circumference of the mold frame, and the second stopper pieces are opposed to the first stopper pieces via the display panel.

The mold frame is sandwiched by the pair of side faces and the pair of end faces.

The first stopper pieces are preferably stepped portions formed by working the side face and the end face, ones formed by folding protrusions protruding from a root of the side face and the end face, or spacer members stuck on the side face and the end face.

The display panel might be connected to a circuit substrate via a plurality of films arranged and spaced by gaps, and the first stopper pieces might be inserted into the gaps. Preferably, the gaps into which the first stopper pieces are inserted are made wider than other gaps.

By the first stopper pieces, not only alignment of the display panel but also the alignment of the mold frame can be implemented.

Distances between the side face and the end face and an alignment face of the first stopper piece are set to 0.1 to 0.5 mm. The distances are preferably 0.3 to 0.5 mm.

As the display panel, a liquid crystal display panel, a plasma display panel, a field emission type display panel, a light emitting diode display panel, or an electroluminescent display panel can be applied.

In accordance with a third aspect of the present invention, there is provided a method for manufacturing a display device comprising the steps of: superimposing a display panel on a mold frame, abutting the display panel to stopper pieces formed in the mold frame for aligning the display panel in the vertical direction and the horizontal direction, covering the display panel by the front frame, and making the display panel contact with the stopper pieces formed in the front frame.

A circuit substrate is attached to the display panel via films arranged and spaced by gaps, and it is preferable to insert the stopper pieces formed in the front frame into the gaps.

In accordance with a fourth aspect of the present invention, there is provided an image terminal unit comprising a front frame having an annular picture frame and having a pair of side faces and a pair of end faces provided in outer circumferential sides of the picture frame, a mold frame sandwiched by the pair of side faces and the pair of end faces, a display panel arranged between the front frame and the mold frame, and a case body fastening the display panel via a fasten member provided in the front frame or the mold frame, wherein stopper pieces for alignment of the display panel are formed in the side faces and the end faces.

In accordance with a fifth aspect of the present invention, there is provided image terminal unit comprising a front frame having an annular picture frame and having a pair of side faces and a pair of end faces provided in outer circumferential sides of the picture frame, a display panel arranged between the front frame and a mold frame, and a case body fastening the display panel via a fasten member provided in the front frame or the mold frame, wherein first stopper pieces for alignment of the display panel are formed in the side face and the end face, second stopper pieces for alignment of the display panel are formed in a circumference of the mold frame, and the second stopper pieces are opposed to the first stopper pieces via the display panel.

The stopper pieces are preferably stepped portions formed by working the side face and the end face, ones formed by folding protrusions protruding from the side face and the end face, or spacer members stuck on the end face and the side face.

DETAILED DESCRIPTION

Embodiment 1

Embodiment 1 is explained below referring to drawings.

Although a liquid crystal display device is explained as an example of a display device in the present embodiment, the present invention is not limited to this, and the present invention can be applied to a display device, for example, in which a plasma display panel, a field emission type display panel, a light emitting diode display panel, or an electroluminescent display panel is incorporated.

Figure 1:
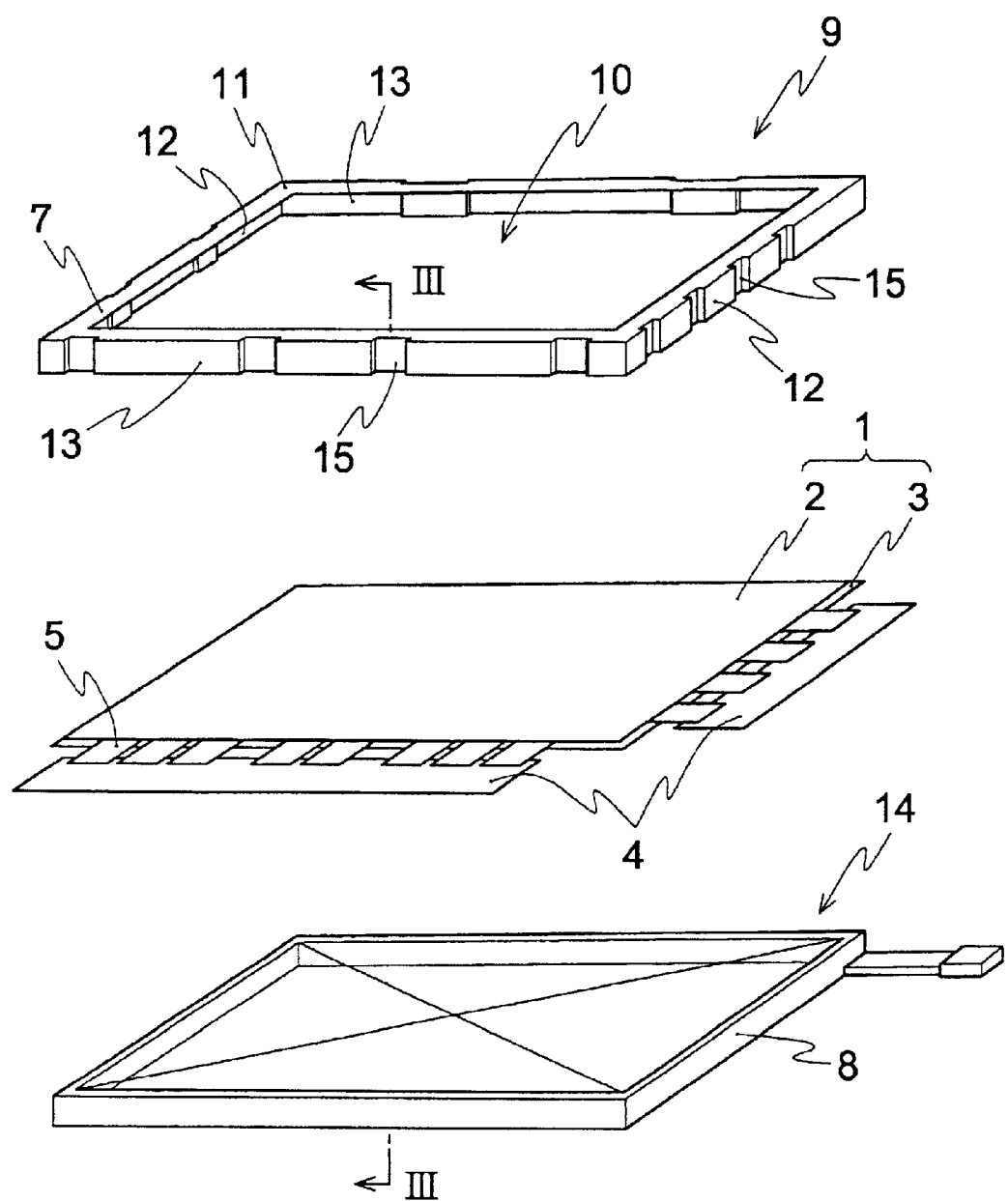
FIG. 1 is an exploded perspective view of a liquid crystal display device showing Embodiment 1 of the present invention.

FIG. 1 is a perspective view in which main constituent members of a liquid crystal display device of Embodiment 1 are taken apart and are shown.

Figure 2:
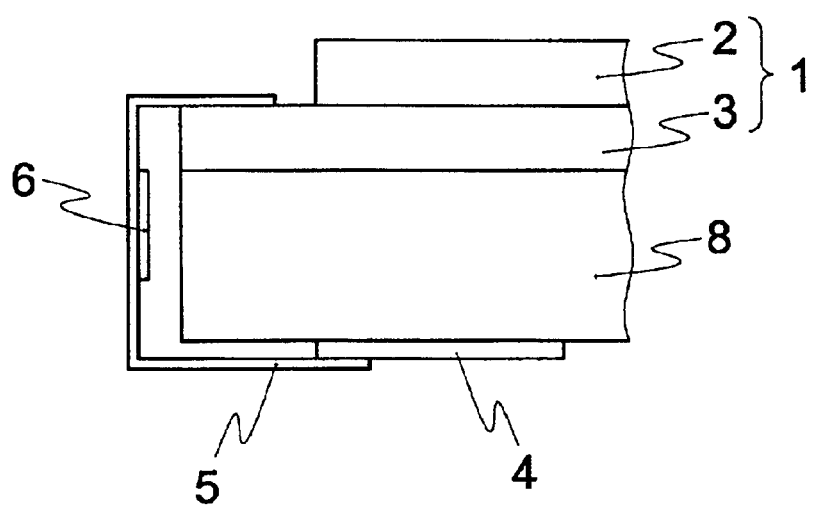
FIG. 2 is a cross-sectional view taken along the line III—III for explaining an arrangement of a TCP film and a circuit substrate in Embodiment 1 of the present invention.

A liquid crystal display panel 1 is composed of top and bottom glass substrates 2, 3 maintaining a predetermined gap (approximately 5 $\mu$m), and liquid crystal injected into the gap. Gate wiring and source wiring are provided in the bottom glass substrate 3 of the liquid crystal display panel 1. Circuit substrates 4 for the gate wiring and the source wiring transmitting signals to the gate wiring and the source wiring are electrically connected to the bottom glass substrate 3 of the liquid crystal display panel via a plurality of TCP (Tape Carrier Package) films 5 arranged at predetermined intervals. As shown in FIG. 2, the TCP films 5 which are connected to the liquid crystal display panel 1 and on which an IC chip 6 is mounted are folded, and by this the circuit substrates 4 are arranged in the back face of a mold frame 8. Here, although the TCP is exemplified and is explained as a connection member between the circuit substrate 4 and the liquid crystal display panel 1, this might be COF (Chip on Film) or FPC (Flexible Printed Circuit).

A liquid crystal display device 9 is manufactured by sandwiching the liquid crystal display panel 1 between a front frame 7 and the mold frame 8. As a material of the front frame 7, a metal such as, for example, stainless steel, is employed, and as a material of the mold frame 8, polycarbonate resin is employed.

Both the front frame 7 and the mold frame 8 have recess-like grooves and are box shaped enclosed by side walls. Here, in order to expose a display face of the liquid crystal display panel 1, an opening part 10 is provided approximately in a center part of the front frame 7. An annular picture frame 11 of the front frame 7 covers the circumference of the display face of the liquid crystal display panel 1. The liquid crystal display panel 1 and the mold frame 8 are sandwiched by pairs of side faces 12 and end faces 13 provided in outer circumferential sides of the picture frame 11 and opposed to each other.

A linear light source 14 is arranged in one end of the recess-like groove of the mold frame 8, and a (acrylic) transparent light-conducting plate adjacent to this light source is accommodated in the recess-like groove. By such arrangement of optical parts, the light from the linear light source entered into the light-conducting plate is multiply scattered by a reflecting layer formed on the back face of the light guide plate, is converted into a plane light source, and then is entered into the back face of the liquid crystal display panel 1.

Figure 3:
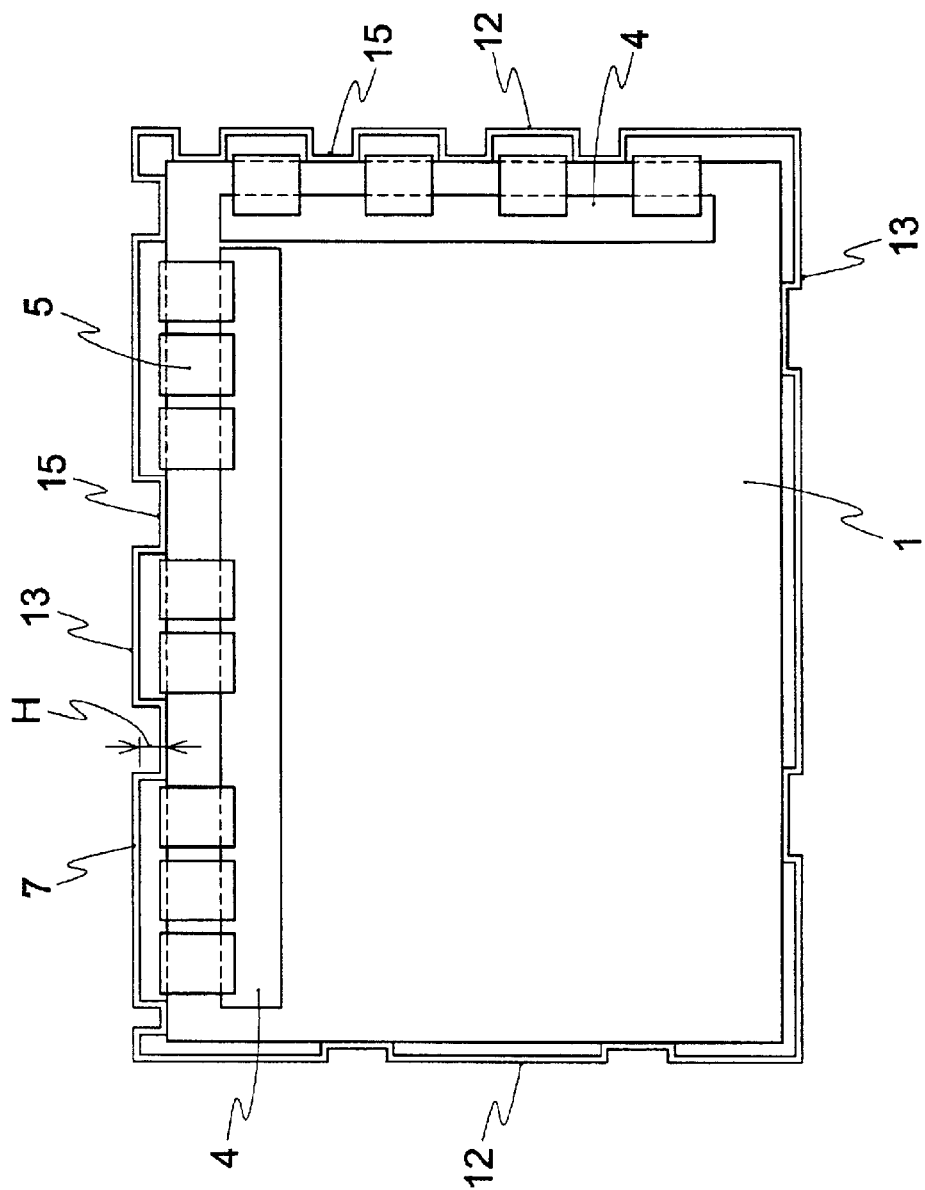
FIG. 3 is a plan view of the back face of the liquid crystal display device showing Embodiment 1 of the present invention.
Figure 4:
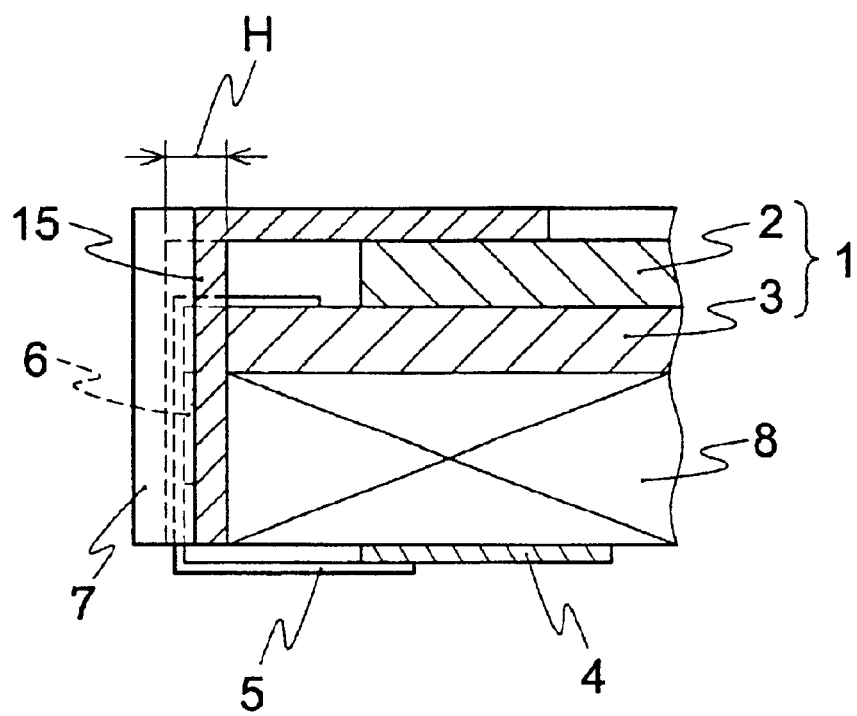
FIG. 4 is a cross-sectional view of the liquid crystal display device for explaining a stopper piece in Embodiment 1 of the present invention.

A characteristic of the present Embodiment 1 is that stopper pieces 15 obtained by deep drawing are provided to the side faces 12 and the end faces 13 of the front frame 7. In the stopper pieces 15, stepped portions are formed with respect to the side faces 12 and the end faces 13, and more specifically, protruding portions are formed so as to convexly protrude when one sees it from an inside groove of the front frame 7. FIG. 3 is a plan view seen from the back face of the liquid crystal display device in a state where the constituent members of FIG. 1 are assembled (wherein the mold frame is omitted for the sake of simplicity of the drawing). FIG. 4 is a view of a state where the constituent members of FIG. 1 are assembled and is a cross-sectional view taken along the line III—III in FIG. 1. The front frame 7 has the pair of side faces 12 and the pair of end faces 13 provided in the outer circumferential sides of the annular picture frame 11 and approximately perpendicularly intersecting with respect to the picture frame 11. The stopper pieces 15 are formed in the faces 12, 13. Although the stopper pieces 15 by deep drawing might be provided in all circumferential sides (all faces of the facing pairs of side faces 12 and end faces 13) of the front frame, by forming the stopper pieces 15 in at least two outer circumferential sides, alignment of the display panel 1 can be implemented reliably.

As shown in FIG. 3 and FIG. 4, when the stopper pieces 15 by deep drawing come in contact with the liquid crystal display panel 1 to implement the alignment of the liquid crystal display panel 1, by the provision of the stopper pieces 15, contact of the folded TCP films 5 with the front frame 7 can be avoided. That is, the stopper pieces 15 play a role to prevent wiring from being cut due to contact of the TCP films 5 with the front frame 7 when implementing alignment of the liquid crystal display panel 1. Here, it is necessary for distances H between the side face 12 and the end face 13 and an alignment face of the stopper piece 15 to be ensured 0.1 mm or more, more preferably 0.3 mm or more, considering (1) the thickness of the film itself, (2) contact of the front frame 7 and the TCP films by vibration, and (3) the degree of bending margin of the film 5. Since narrowing the front frame is not achieved when the distance H is made too large, the maximum value of the distance H is preferably 0.5 mm.

Figure 5:
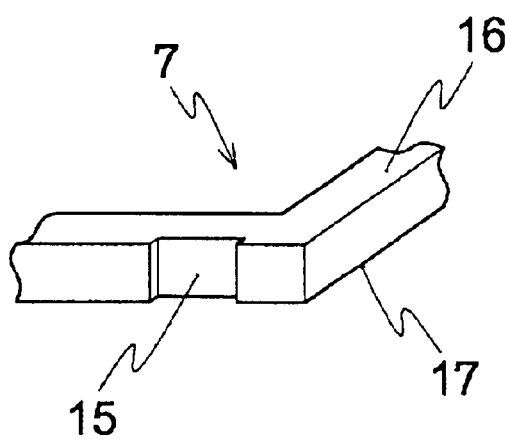
FIG. 5 is a perspective view of a front frame in Embodiment 1 of the present invention.

Although the stopper pieces 15 can be continuously formed from a picture frame face 16 to a bottom face 17 of the front frame 7 as shown in FIG. 5, they might be formed partially from the picture frame face of the front frame 7 to the bottom glass substrate 3 of the liquid crystal display panel 1. Forming the stopper pieces 15 continuously allows the alignment of the liquid crystal display panel 1 as well as the alignment of the mold frame 8 to be implemented.

Figure 6A:
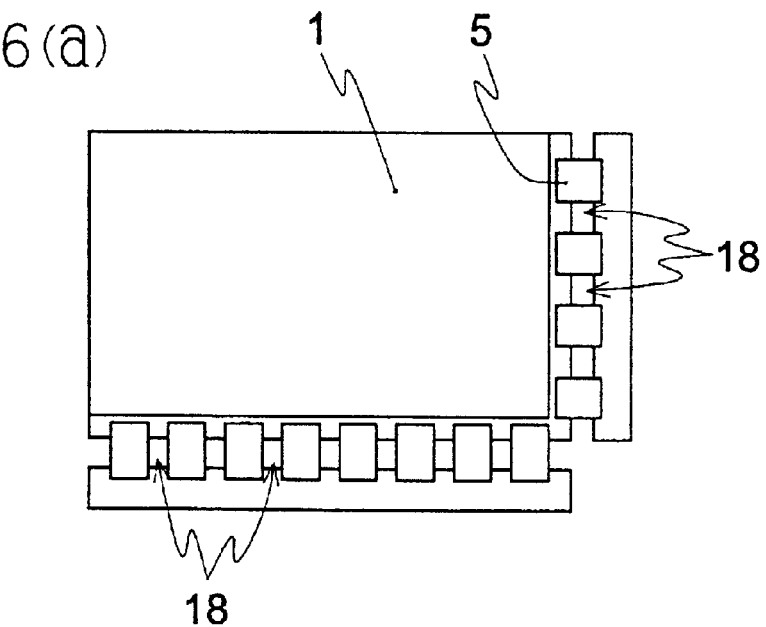
FIG. 6 is a plan view (a) and another plan view (b) of the liquid crystal display panel connected with the circuit substrate in Embodiment 1 of the present invention.
Figure 6B:
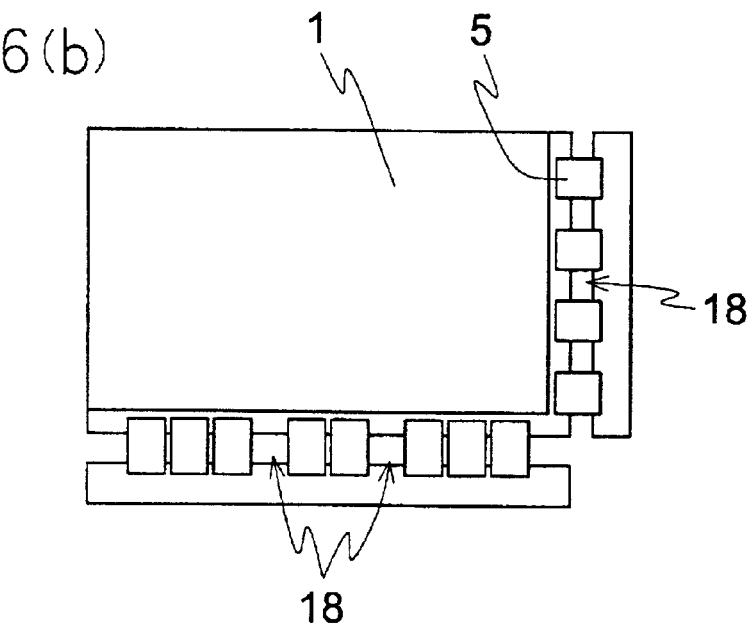

The plural TCP films 5 might be arranged at uniform intervals on the liquid crystal display panel 1 so that the stopper pieces 15 of FIG. 3 are inserted into gaps 18 (approximately 1 mm) between the films as shown in FIG. 6 (a), or the plural TCP films 5 might be arranged at uneven intervals on the liquid crystal display panel 1 so that the stopper pieces 15 are inserted into the gaps 18 (approximately 4 mm) whose distances between films are expanded as shown in FIG. 6 (b). If the stopper pieces 15 are inserted into the widened portions, the width of the stopper piece 15 can be widened approximately 4 mm at maximum, and thus in the alignment of the bottom glass substrate 3 of the liquid crystal display panel 1, impact upon the glass can be mitigated.

Figure 11:
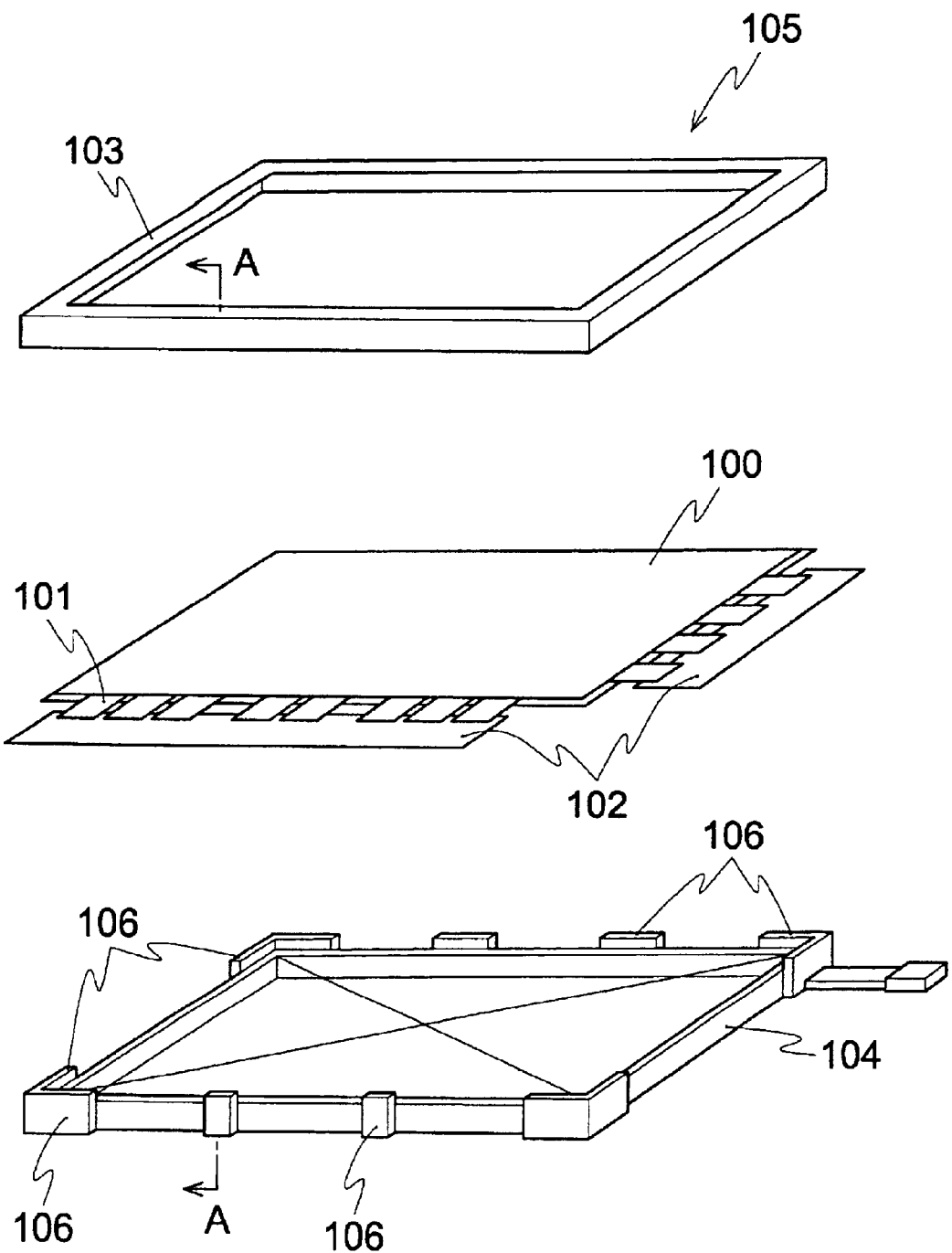
FIG. 11 is an exploded perspective view of a conventional liquid crystal display device.
Figure 12:
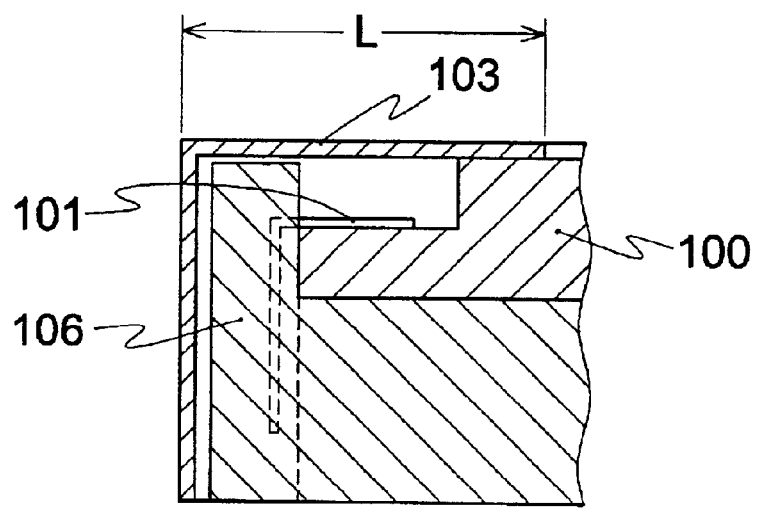
FIG. 12 is a cross-sectional view taken along the lines A—A of the liquid crystal display device for explaining a conventional rib.

By adopting the structure described above, the ribs 106 integrally molded with the mold frame of FIG. 11 and FIG. 12 become unnecessary, and the width of the picture frame can be narrowed only a value obtained by deducting a desired range (0.1 to 0.5 mm) for the distance H from the wall thickness (1 to 2 mm) of the rib 106, thereby contributing to narrowing of the picture frame of the liquid crystal display device 9.

Since the deep drawing described in the present Embodiment 1 is excellent in forming accuracy, there is an advantageous effect that alignment precision can be improved. Further, since it is possible to process the front frame and form a stopper piece, it becomes possible to restrict manufacturing cost of the stopper piece low.

Embodiment 2

Embodiment 2 is explained below referring to drawings.

Since other structures except for parts related to the structure of a stopper piece are the same as those in Embodiment 1, the explanation thereof is omitted.

Figure 7A:
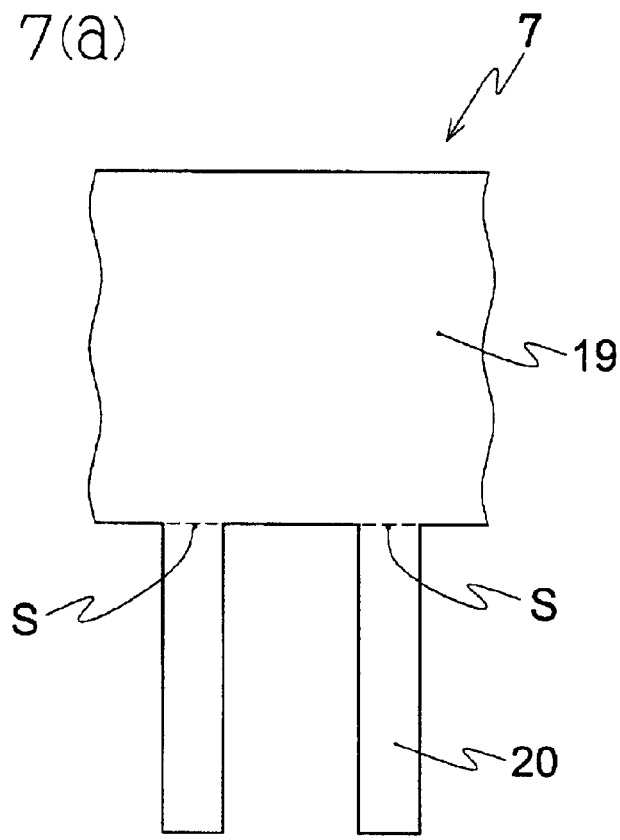
FIG. 7 is a side view (a) for explaining the structure of stopper pieces and a sectional view (b) of a liquid crystal display device in Embodiment 2 of the present invention.
Figure 7B:
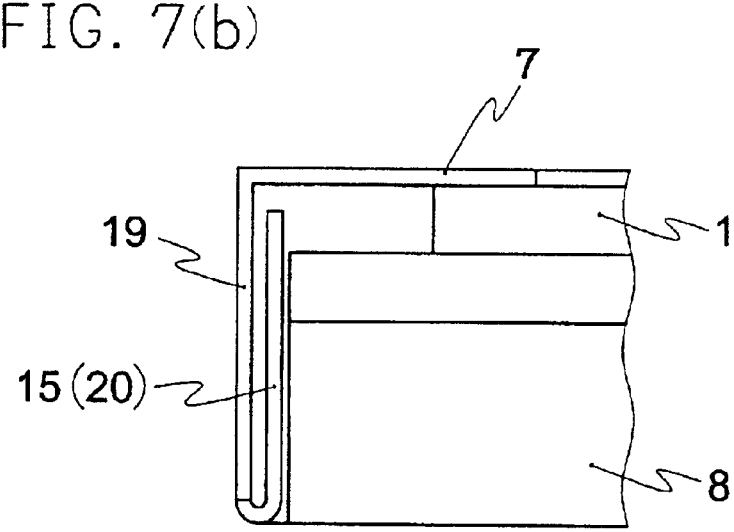

FIG. 7 (a) is a side view for explaining the structure of a stopper piece arranged in the front frame, and FIG. 7 (b) is a sectional view of a liquid crystal display device regarding Embodiment 2. Protrusions 20 protruding from a root 19 of the side faces and the end faces of the front frame 7 are formed. The protrusions 20 are folded along broken lines S shown in FIG. 7 (a). The folded protrusions 20 are employed as the stopper pieces 15 for alignment of the liquid crystal display panel 1 and the mold frame 8. As a material of the front frame 7, a metal capable of being folded, for example, aluminum or stainless steel, is employed.

With respect to folding process described in the present Embodiment 2, there is an advantageous effect that it is possible to reduce cost, similarly to the deep drawing described in Embodiment 1.

Embodiment 3

Embodiment 3 is explained below referring to a drawing.

Since other structures except for parts related to the structure of a stopper piece are the same as those in Embodiment 1, the explanation thereof is omitted.

Figure 8:
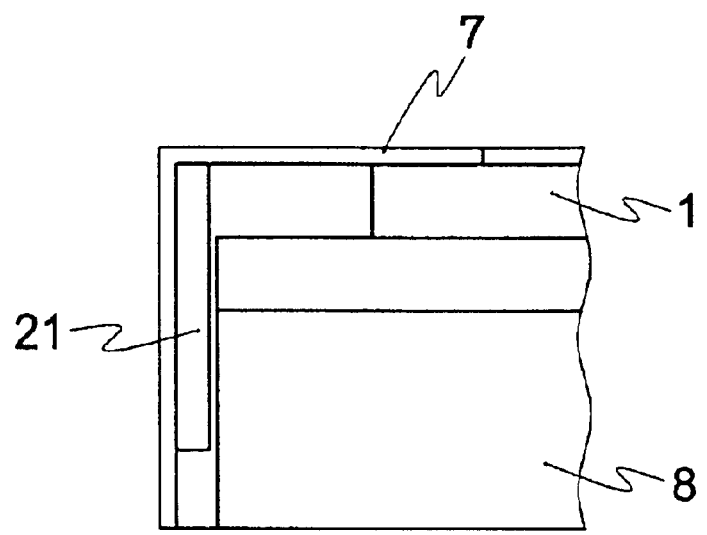
FIG. 8 is a sectional view of a liquid crystal display device for explaining a stopper piece in Embodiment 3 of the present invention.

FIG. 8 is a sectional view of a liquid crystal display device for explaining the structure of a stopper piece arranged in the front frame regarding Embodiment 3. Rectangular spacer members 21 are stuck on the side faces and the end faces of the front frame 7, with employing an adhesive agent, a double-stick tape, welding, or the like. As a material of the spacer member 21, for example, a metal is employed.

By employing the spacer member described in the present Embodiment 3, even when a material for which accurate working is difficult is employed for the front frame, a stopper piece can be formed.

Embodiment 4

Embodiment 4 is explained below referring to drawings.

Since other structures except for parts related to the structure of a stopper piece are the same as those in Embodiment 1, the explanation thereof is omitted.

Figure 9:
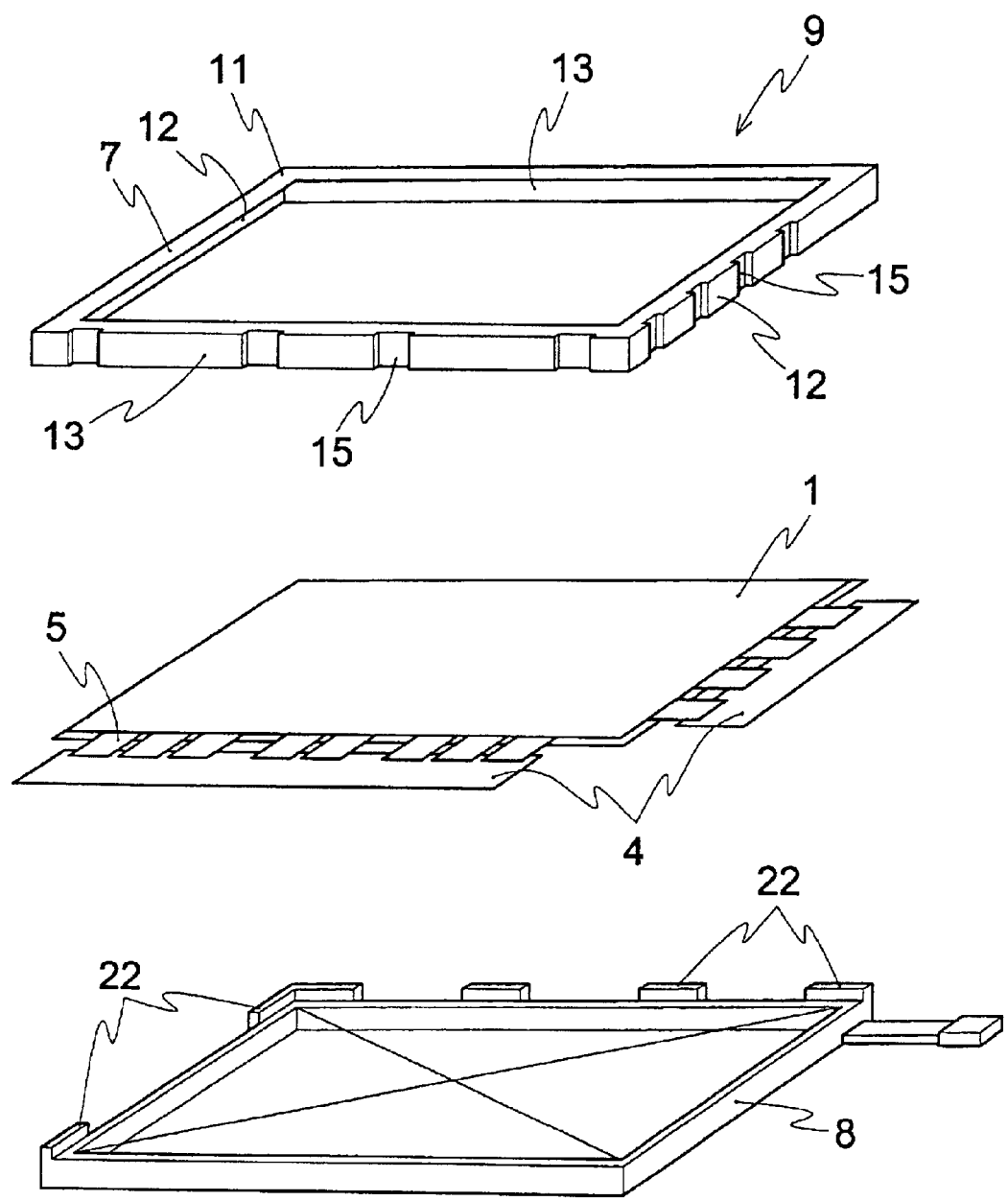
FIG. 9 is an exploded perspective view of a liquid crystal display device showing Embodiment 4 of the present invention.

FIG. 9 is a perspective view in which main constituent members of a liquid crystal display device of Embodiment 4 are taken apart and are shown.

In the front frame 7, stopper pieces 15 (protrusions) by deep drawing are formed in either ones of the mutually facing pairs of side faces 12 and end faces 13. In the mold frame 8, other stopper pieces 22 opposed to the stopper pieces 15 via the display panel 1 are formed. By the stopper pieces 22 integrally molded with the mold frame 8, alignment accuracy of the liquid crystal display panel 1 and the mold frame 8 is remarkably improved.

The liquid crystal display device 9 shown in FIG. 9 is manufactured as follows.

First, the liquid crystal display panel 1 is superimposed on the mold frame 8 so that the liquid crystal display panel 1 abuts the stopper pieces 22 integrally molded with the mold frame 8, whereby alignment in the vertical direction and the horizontal direction of the liquid crystal display panel 1 is implemented. Here, the circuit substrates 4 are attached to the circumference of the liquid crystal display panel 1 via the plurality of TCP films 5 spaced by gaps, and the TCP films 5 are folded so that the circuit substrates 4 are arranged on the back face of the mold frame 8.

Then, the liquid crystal display panel 1 is covered by the front frame 7, and the stopper pieces 15 formed in the front frame 7 are inserted into the gaps between the TCP films attached to the liquid crystal display panel 1 so that the stopper pieces 15 are brought into contact with the liquid crystal display panel 1 to implement alignment.

Thus, the picture frame 11 of the front frame 7 in which the stopper pieces 15 are formed can be narrowed, and the liquid crystal display panel 1 can abut and come in contact with the stopper pieces 22 of the mold frame 8, whereby troublesome alignment work becomes unnecessary, and manufacturing process related thereto can be simplified.

Although an example in which the stopper pieces 15 (stepped portions) are formed by deep drawing explained in Embodiment 1 is explained in the present Embodiment 4, the present invention is not limited to this, and even when stopper pieces by folding process (Embodiment 2) or of spacer members (Embodiment 3) are formed, similar effects can be obtained.

Embodiment 5

Figure 10:
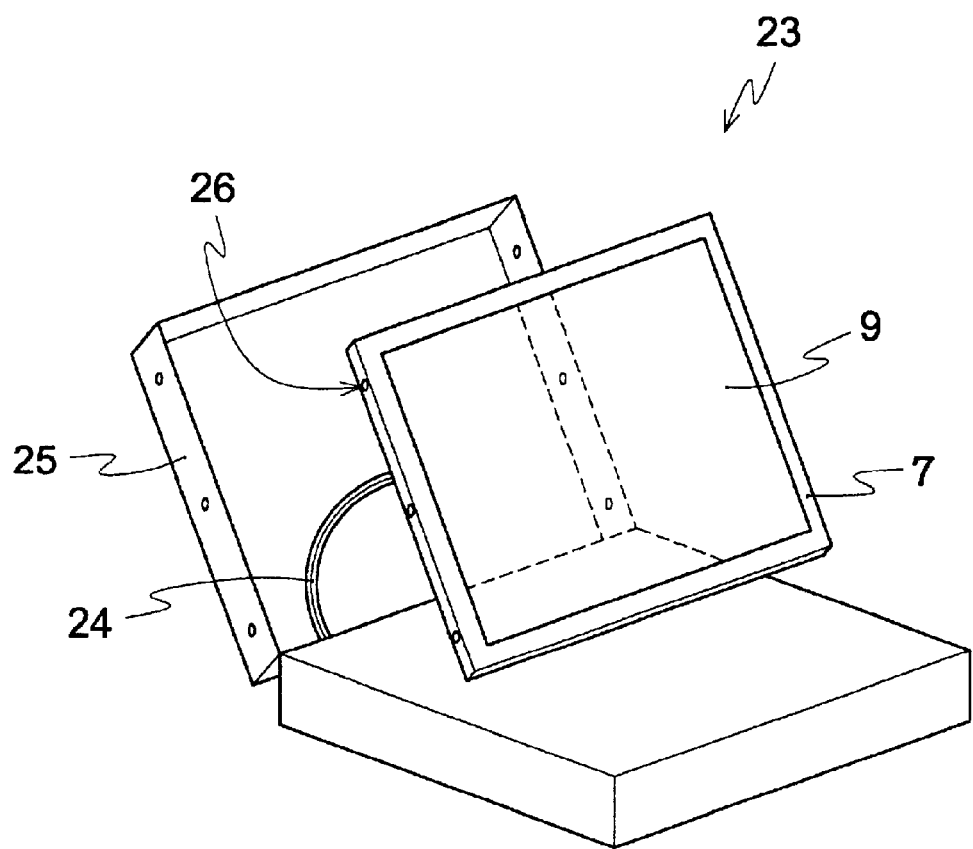
FIG. 10 is an exploded perspective view of an image terminal unit showing Embodiment 5 of the present invention.

FIG. 10 is an exploded perspective view of an image terminal unit (e.g., a personal computer) provided with a display device of the present invention. Respective lines 24 of signal line, ground line, and power supply line of a personal computer 23 are connected to the circuit substrates of the liquid crystal display device 9, and the liquid crystal display device 9 is accommodated inside a case body 25 together with these lines. At this time, the liquid crystal display device is fastened to the case body 25 via fasten members 26 such as tapped holes and double-stick tape provided in the front frame 7 or the mold frame 8.

Here, the picture frame of the front frame 7 of the liquid crystal display device 9 is narrowed, and when the front frame 7 is mounted in the image terminal unit such as the personal computer 23, an effective display area of an image face is widened by narrowing the picture frame, compared to a conventional one, and thus the commercial value of the personal computer 23 can be increased.

According to the first aspect of the present invention, since stopper pieces for alignment of a display panel are formed in a front frame, a display device in which the picture frame of the front frame can be narrowed is obtainable.

According to the second aspect of the present invention, since the first stopper pieces for alignment of a display panel are formed in a front frame, and second stopper pieces for alignment of the display panel are formed in a mold frame while opposed to the first stopper pieces, the picture frame of the front frame can be narrowed, and a display device in which alignment accuracy of the display panel and the mold frame can be improved is obtainable.

According to the third aspect of the present invention, since after stopper pieces formed in a mold frame are brought into contact with one sides of both side faces and both end faces of a display panel to abut them, other sides of both side faces and both end faces of the display panel are brought into contact with the stopper pieces formed in the front frame to implement alignment, process of alignment work for the display panel and the mold frame can be simplified, and a manufacturing method of a display device which can cope with narrowing of the picture frame is obtainable.

According to the fourth aspect of the present invention, since stopper pieces for alignment of a display panel are formed in a front frame, by narrowing an image terminal unit in which the picture frame of the front frame can be narrowed to thereby widen an display image face is obtainable.

What is claimed is:

1. A display device comprising:
    a front frame having an annular picture frame, said annular picture frame having a pair of side faces and a pair of end faces provided in outer circumferential sides of the annular picture frame;
    a mold frame sandwiched by the pair of side faces and the pair of end frames;
    a display panel arranged between the front frame and the mold frame; and
    stopper pieces for alignment of the display panel formed in the side faces and the end faces of the annular picture frame and extend inward from the annular picture frame.

2. The display device of claim 1, wherein the stopper pieces are stepped portions formed by working the side faces and the end faces.

3. The display device of claim 1, wherein the stopper pieces are ones formed by folding protrusions protruding from a root of the side faces and the end faces.

4. The display device of claim 1, wherein the stopper pieces are spacer members stuck on the side faces and the end faces.

5. The display device of any one of claims 1 to 4, wherein the display panel is connected to a circuit substrate via a plurality of films arranged and spaced by gaps, and the stopper pieces are inserted into the gaps.

6. The display device of claim 5, wherein the gaps into which the stopper pieces are inserted are made wider than other gaps.

7. The display device of any one of claims 1 to 4, wherein not only alignment of the display panel but also alignment of the mold frame are implemented by the stopper pieces.

8. The display device of any one of claims 1 to 4, wherein distances between the side face and the end face and an alignment face of the stopper piece are set to 0.1 to 0.5 mm.

9. The display device of claim 8, wherein the distances are 0.3 to 0.5 mm.

10. The display device of any one of claims 1 to 4, wherein the display panel is a liquid crystal display panel, a plasma display panel, a field emission type display panel, a light emitting diode display panel, or an electroluminescent display panel.

11. A display device comprising:
- a front frame having an annular picture frame, said annular picture frame having a pair of side faces and a pair of end faces provided in outer circumferential sides of the annular picture frame;
- a display panel arranged between the front frame and the mold frame;
- first stopper pieces for alignment of the display panel are formed in the side face and the end face of the annular picture frame and extend inward from the annular picture frame;
- second stopper pieces for alignment of the display panel are formed in a circumference of the mold frame and extend toward the annular picture frame; and
- the second stopper pieces being opposed to the first stopper pieces via the display panel.

12. The display device of claim 11, wherein the mold frame is sandwiched by the pair of side faces and the pair of end faces.

13. The display device of any one of claims 11 to 12, wherein the stopper pieces are stepped portions formed by working the side faces and the end faces.

14. The display device of any one of claims 11 to 12, wherein the stopper pieces are ones formed by folding protrusions protruding from a root of the side faces and the end faces.

15. The display device of any one of claims 11 to 12, wherein the stopper pieces are spacer members stuck on the side faces and the end faces.

16. The display device of any one of claims 11 to 12, wherein the display panel is connected to a circuit substrate via a plurality of films arranged and spaced by gaps, and the stopper pieces are inserted into the gaps.

17. The display device of claim 16, wherein the gaps into which the stopper pieces are inserted are made wider than other gaps.

18. The display device of any one of claims 11 to 12, wherein not only alignment of the display panel but also alignment of the mold frame are implemented by the stopper pieces.

19. The display device of any one of claims 11 to 12, wherein distances between the side face and the end face and an alignment face of the stopper piece are set to 0.1 to 0.5 mm.

20. The display device of claim 19, wherein the distances are 0.3 to 0.5 mm.

21. The display device of any one of claims 11 to 12, wherein the display panel is a liquid crystal display panel, a plasma display panel, a field emission type display panel, a light emitting diode display panel, or an electroluminescent display panel.

* * * * *